(12) United States Patent
Brockman

(10) Patent No.: US 10,215,422 B2
(45) Date of Patent: Feb. 26, 2019

(54) APPLIANCE HOOD MOUNTING SYSTEM

(71) Applicant: General Electric Company, Schenectady, NY (US)

(72) Inventor: Sherry Payne Brockman, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 357 days.

(21) Appl. No.: 14/986,778

(22) Filed: Jan. 4, 2016

(65) Prior Publication Data
US 2017/0191674 A1 Jul. 6, 2017

(51) Int. Cl.
*F24C 15/20* (2006.01)
*F16M 13/02* (2006.01)

(52) U.S. Cl.
CPC ......... *F24C 15/2071* (2013.01); *F16M 13/02* (2013.01); *F24C 15/2042* (2013.01)

(58) Field of Classification Search
CPC .. F24C 15/2042; F24C 15/2071; F16M 13/02
See application file for complete search history.

(56) References Cited

U.S. PATENT DOCUMENTS

| | | | |
|---|---|---|---|
| 4,011,803 A | 3/1977 | Pfaffinger | |
| 2014/0352151 A1* | 12/2014 | Bruin-Slot | .......... F24C 15/2071 29/897.3 |
| 2015/0047198 A1 | 2/2015 | Bruin-Slot et al. | |

\* cited by examiner

*Primary Examiner* — Alfred Basichas
(74) *Attorney, Agent, or Firm* — Dority & Manning, P.A.

(57) ABSTRACT

The present disclosure relates, generally, to an appliance including an appliance hood and a plurality of support brackets. The appliance hood may include a plurality of apertures that correspond to the plurality of support brackets. Each of the plurality of support brackets may be configured to selectively mount within a corresponding aperture.

19 Claims, 14 Drawing Sheets

United States Patent US 10,215,422 B2

APPLIANCE HOOD MOUNTING SYSTEM

FIELD OF THE INVENTION

The present subject matter relates generally to appliance systems, and more particularly, the present subject matter relates to an appliance hood mounting system.

BACKGROUND OF THE INVENTION

Ventilation or range hoods are often provided in appliances for the treatment of heat and fumes generated during cooking. As a result, a ventilation hood must often be positioned above a cooking surface. However, the positioning and installation of a ventilation hood may be highly contingent on the room and environment in which the ventilation hood is installed. Since many hoods are configured to be structurally distinct from a corresponding cooking surface, the ventilation hood must often be installed or mounted against an elevated surface over the cooking surface.

For instance, certain ventilation hoods are configured to mount beneath a cabinet or otherwise solid overhead surface. However, many ventilation hoods are only configured to be mounted at a singular position, i.e., with a single mounting footprint. This may create difficulties for installation. The wide variety of cabinet shapes and sizes may create difficulties when installing or mounting the ventilation hood. A ventilation hood may be formed to mount to a single cabinet shape and size, but this may greatly limit the marketability and use of the ventilation hood, especially for custom-made cabinet structures. If the cabinet is larger than the hood, multiple additional trim pieces may be required and as additional attachments in order to accommodate a specific ventilation hood footprint. However, this may compromise the overall aesthetic or rigidity of the ventilation hood. Moreover, it may create difficulties for the installation process. Specifically, the installation process may become exceedingly complex and/or require a great deal of time in order to ensure the ventilation hood is adequately and securely mounted. Multiple installers may be required for a single hood.

As a result, there is a need for an appliance installation or mounting system which may be used with a variety of mounting surfaces. In addition, there is also a need for an appliance installation or mounting system that may be quickly and easily installed.

BRIEF DESCRIPTION OF THE INVENTION

The present disclosure relates, generally, to an appliance including an appliance hood and a plurality of support brackets. The appliance hood includes a plurality of apertures that correspond to each of the support brackets. The support brackets may each be configured to selectively mount within a corresponding aperture. Advantageously, the appliance may be easier to install in a wider range of environments than conventional systems. Additional aspects and advantages of the invention will be set forth in part in the following description, or may be obvious from the description, or may be learned through practice of the invention.

In one exemplary embodiment, an appliance is provided. The appliance includes an appliance hood extending between a front and a back. The appliance hood includes a mounting plate defining a rear aperture pair at the back and a forward aperture pair at the front. Each rear aperture has a width extending in a lateral direction and a length extending in a transverse direction. Each forward aperture has a width extending in the lateral direction and a length extending in the transverse direction. The appliance further includes a rear bracket pair and a forward bracket pair. Each rear bracket is slidably disposed through a corresponding rear aperture and includes a rear cabinet tab disposed above the mounting plate in a vertical direction, and a rear appliance tab disposed below the mounting plate orthogonal to the rear cabinet tab. The rear appliance tab has a width extending in the lateral direction while the width of the rear appliance tab is greater than the width of the rear cabinet tab. Each forward bracket is slidably disposed through a corresponding forward aperture and includes a forward cabinet tab disposed above the mounting plate in the vertical direction, and a forward appliance tab disposed below the mounting plate and orthogonal to the forward cabinet tab. The forward cabinet tab has a length extending in the transverse direction while the length of the forward cabinet tab is less than the width of the corresponding forward aperture.

In another exemplary embodiment, an appliance is provided. The appliance includes an appliance hood and a plurality of support brackets. The appliance hood extends between a front and a back and includes a mounting plate defining a plurality of apertures. Each aperture has a width extending in a lateral direction and a length extending in a transverse direction. Each support bracket includes a cabinet tab disposed above the mounting plate in a vertical direction and an appliance tab disposed below the mounting plate orthogonal to the cabinet tab. The cabinet tab has a length extending in the transverse direction that is less than the width of the corresponding aperture. The appliance tab has a length extending in the transverse direction that is greater than the length of the corresponding aperture.

In a further exemplary embodiment, an appliance is provided. The appliance includes an appliance hood and a plurality of support brackets. The appliance hood extends between a front and a back and includes a mounting plate defining a plurality of apertures. Each aperture has a width extending in a lateral direction and a length extending in a transverse direction. Each support bracket is selectively positionable through a corresponding aperture along the width of the corresponding aperture and includes a cabinet tab and an appliance tab. The cabinet tab is mountable above the mounting plate in a vertical direction. The cabinet tab has a length extending in the transverse direction that is less than the width of the corresponding aperture. The appliance tab is orthogonal to the cabinet tab and mountable below the mounting plate. The appliance tab also has a length extending in the transverse direction that is greater than the length of the corresponding aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
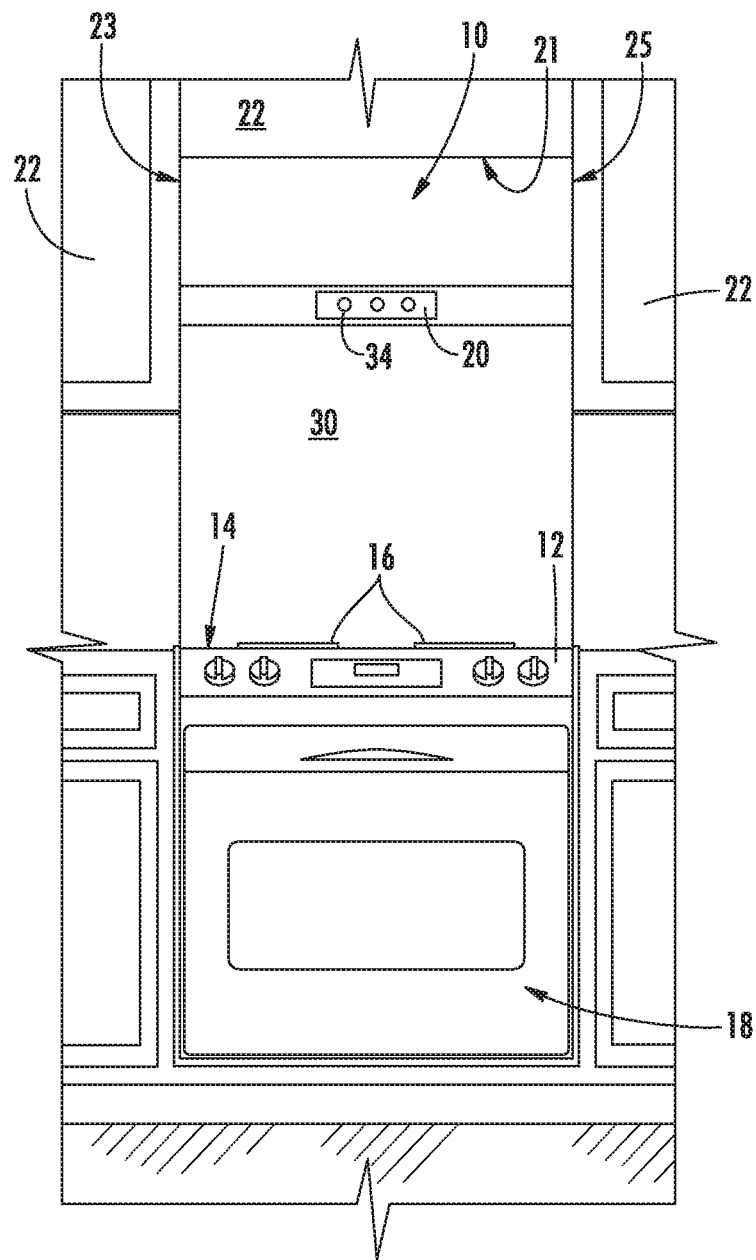
FIG. 1 provides a front view of an appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides an exemplary embodiment of an appliance hood 10 installed within one or more kitchen cabinets 22. As shown, some embodiments of the appliance hood 10 can be positioned over an oven 12 that includes a horizontal, cook-top surface 14 having multiple heating elements 16 positioned thereon. In some embodiments, a cook-top surface 14 may be provided absent an oven. Heating elements 16 may be e.g., electrically-powered or gas fueled and provide heat for cooking food placed into pots or pans and positioned onto such elements 16. Oven 12 includes a cavity, positioned behind door 18, into which food items may be placed for baking and/or broiling.

Figure 2:
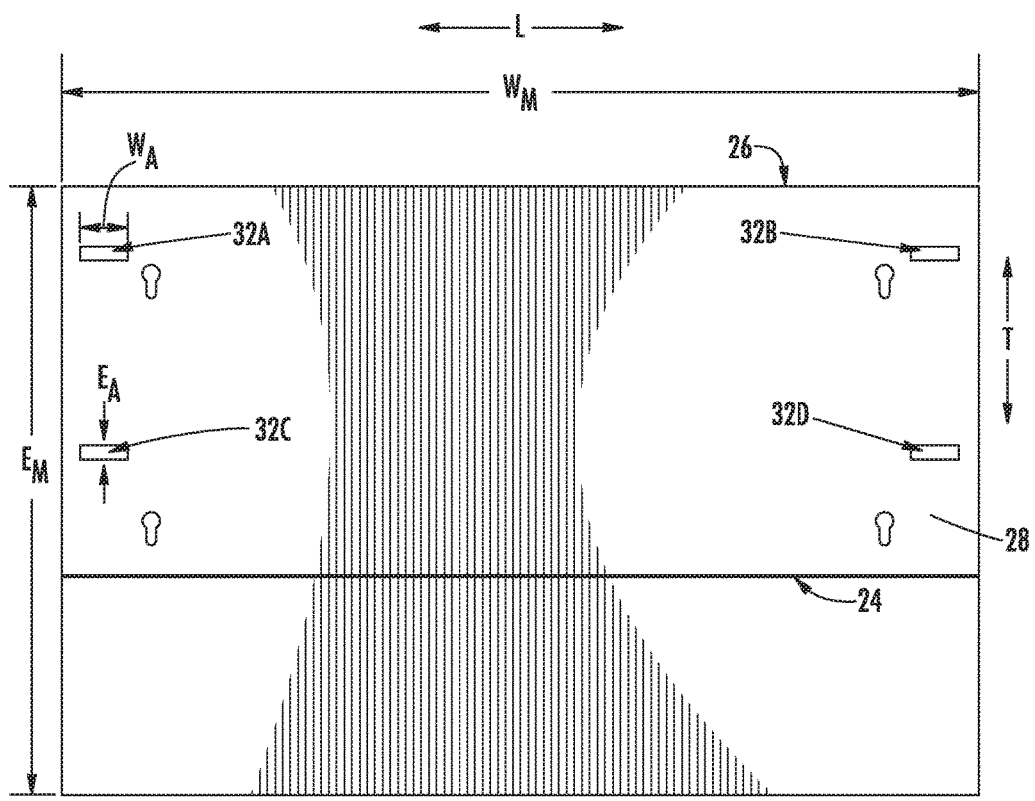
FIG. 2 provides an overhead view of an appliance hood according to an exemplary embodiment of the present disclosure.
Figure 3:
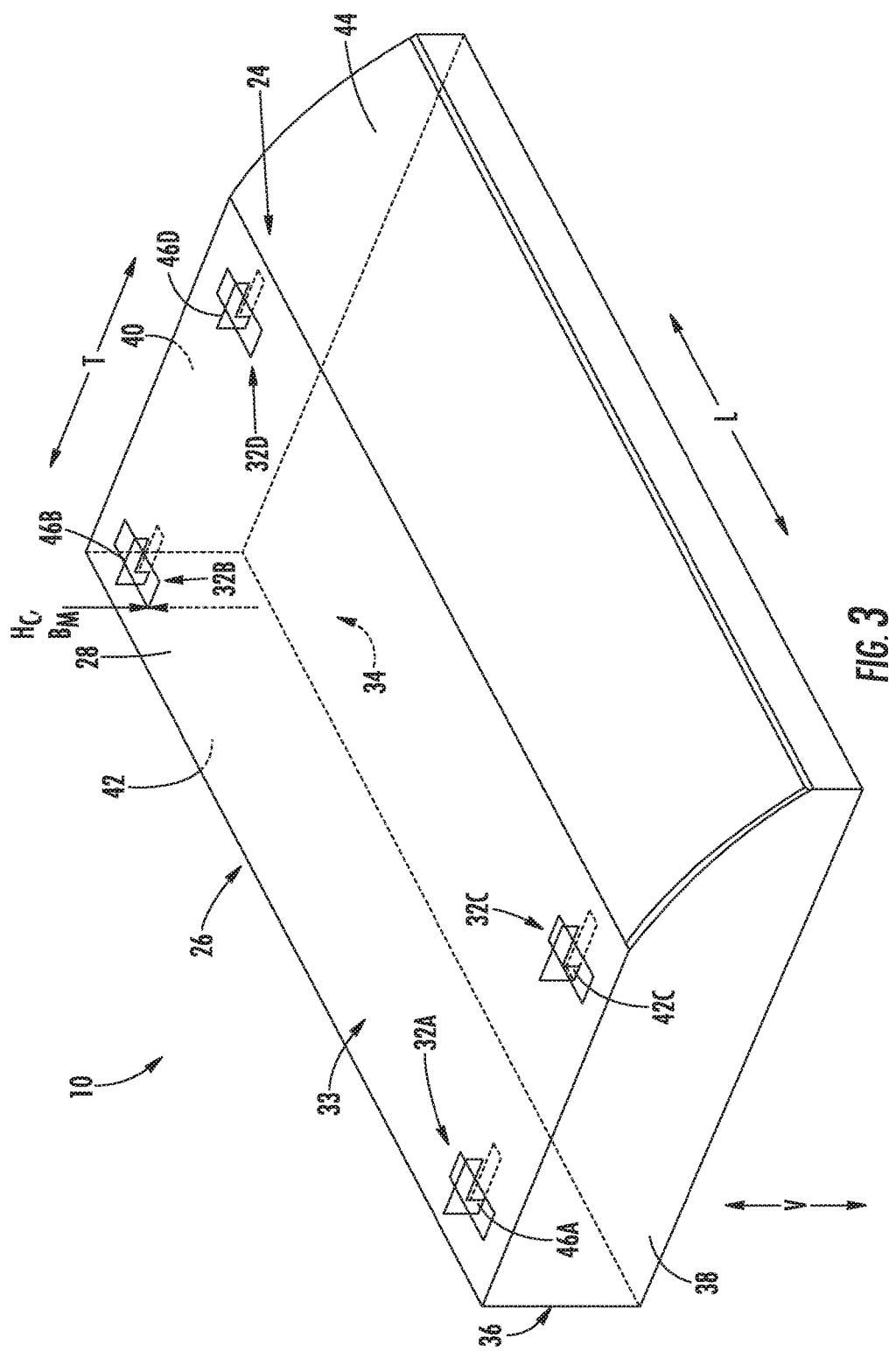
FIG. 3 provides a perspective view of an appliance hood according to an exemplary embodiment of the present disclosure.

As shown in FIGS. 2 and 3, the appliance hood 10 of some embodiments is configured as a range hood configured to direct light or air above the cook-top surface 14. A top mounting plate 28 covers the transverse length $E_M$ between the front 24 and back 26 and includes a fixed width $W_M$ extending in the span wise horizontal or lateral direction L. For this embodiment, mounting plate 28 has a thickness along the vertical direction V between a top surface 33 and a bottom surface 34 designated as thickness $B_M$ (see FIG. 3). When mounted within the cabinet(s) 22 of FIG. 1, the back 26 may be positioned proximal to a backsplash wall 30 or rear portion of the cabinet(s), while the front 24 will be positioned distal to the same wall 30 and/or cabinet portion.

One or more vertical passages or apertures 32 may be defined through the mounting plate 28. Moreover, the mounting plate 28 as a whole may be shaped to complement the downward-facing surface 21 of a cabinet 22. For instance, the exemplary mounting plate 28 embodiment of FIG. 3 is shaped as a substantially flat horizontal plate corresponding to a substantially flat cabinet bottom 35 (see FIG. 4). However, alternative embodiments may include other more suitable shapes.

Some embodiments of the appliance hood 10 further include a canopy skirt 36 descending from the mounting plate 28. As illustrated, the exemplary embodiment of the canopy skirt 36 includes a plurality of skirt walls 38, 40, 42, 44 surrounding or disposed about the perimeter of the mounting plate 28. Specifically, the exemplary canopy skirt 36 includes oppositely-disposed left and right skirt walls 38, 40 spaced apart from each other along lateral direction L. A rear skirt wall 42 is positioned on the back 26 of the mounting plate 28, and a front skirt wall 44 is positioned on the front 24, spaced apart from the rear skirt wall 42 along the transverse direction T. One or more of the skirt walls 38, 40, 42, 44 may be vertically extending, but in some embodiments the front skirt wall 44 will be arcuately disposed from the mounting plate 28 at the front 24. Other embodiments of the canopy skirt 36 may be provided with additional or alternative suitable shapes and styles.

In the exemplary embodiments of FIGS. 2 and 3, the apertures 32 are defined by the mounting plate 28 as corresponding pairs. As shown, a rear aperture pair 32A, 32B is defined at or near the back 26 of the mounting plate 28 while a forward aperture pair 32C, 32D is defined at or near the front 24. Each pair includes a left aperture (32A or 32C) and a right aperture (32B or 32D). When mounted, the left apertures 32A, 32C and right apertures 32B, 32D may be positioned near respective left 23 and right 25 sides of the cabinet(s) 22 (see FIG. 1).

As shown in FIGS. 2 and 3, each aperture 32 has a plurality of predetermined dimensions, including width, length, width and height (e.g., maximum width, maximum length, and maximum height). For instance, each aperture 32 includes a width $W_A$ extending in the lateral direction L and a length $E_A$ extending in the transverse direction T. A height or depth $D_A$ of each aperture 32 is defined through the mounting plate 28 in the vertical direction V (see FIG. 3). In the exemplary embodiment of FIG. 2, the length $E_A$ and width $W_A$ of the apertures 32A, 32B, 32C, 32D form a generally rectangular shape wherein the width $W_A$ is greater than the length $E_A$. In the illustrated embodiments of FIGS. 2 and 3, the length $E_A$ and width $W_A$ of each aperture 32 is substantially equal to that of the other apertures. In alternative embodiments, the length $E_A$ and width $W_A$ of a rear aperture pair 32A, 32B may be distinct and different from the length $E_A$ and width $W_A$ of a forward aperture pair 32C, 32D.

In some embodiments, a plurality of brackets 46 is provided to correspond to the plurality of discrete apertures 32. For instance, in the exemplary embodiment of FIG. 3, a plurality of brackets 46A, 46B, 46C, 46D is provided. A rear bracket pair 46A, 46B corresponds to the rear aperture pair 32A, 32B. A front bracket pair 46C, 46D corresponds to the front aperture pair 32C, 32D.

Turning to FIGS. 4 through 24, multiple exemplary embodiments of a support bracket 46 are provided. Generally, the exemplary embodiments of FIGS. 4 through 24 illustrate several non-limiting examples of an individual bracket 46 for mounting the appliance hood 10 to the cabinet(s) 22. As shown, the support bracket 46 includes a cabinet tab 48 and an appliance tab 50. In the illustrated embodiments, the cabinet tab 48 is a substantially vertical member while the appliance tab 50 is a generally horizontal member that is orthogonal to the cabinet tab 48. An integral neck 52 extends between the cabinet tab 48 and appliance tab 50, joining them together.

Figure 4:
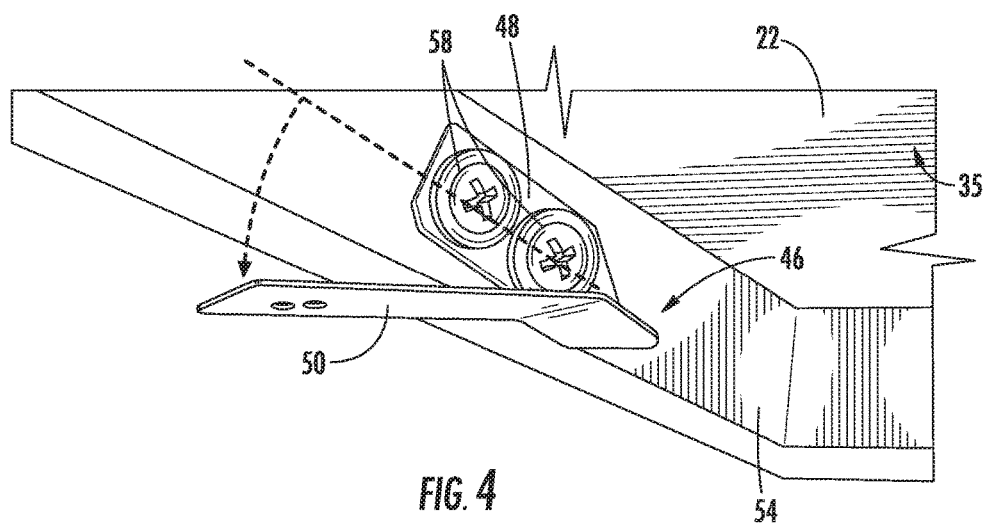
FIG. 4 is a perspective view of a bracket according to an exemplary embodiment of the present disclosure.

As shown in FIG. 4, the cabinet tab 48 may be selectively fixed to a cabinet 22 at, for example, a vertically-descending trim frame 54. Moreover, the cabinet tab 48 may be fixed to the cabinet 22 before being secured to the appliance hood 10. The appliance tab 50 may be configured as a resilient member capable of being deformed downward to receive a rear aperture 32A, 32B of the appliance hood 10 (see FIGS. 2 and 3). Once inserted through a corresponding rear aperture 32A, 32B, the appliance tab 50 may be returned to its substantially horizontal position to support the appliance hood 10.

In the illustrated embodiment of FIG. 4, multiple attachment holes 56 are defined through the cabinet tab 48 and configured to receive a rigid attachment member 58 (e.g., a nail, bolt, hook, clip, or screw). Another attachment hole 56 is defined through the appliance tab 50 to receive an additional rigid attachment member 58. Although the attachment holes 56 of FIG. 4 are illustrated as circular passages, additional or alternative embodiments may include holes having a different configuration. Further additional or alternative embodiments may be substantially solid and free of holes. Moreover, the cabinet tab 48 and/or the appliance tab 50 may include another suitable attachment member. For instance, some embodiments may include a non-mechanical attachment member (e.g., adhesive or weld) suitable for fixing the cabinet tab 48 to the trim frame 54 and/or the appliance tab 50 to the appliance hood 10.

Turning to FIGS. 5 through 9, an exemplary embodiment of a support bracket 46 is illustrated. Optionally, the exemplary support bracket 46 of FIGS. 5 through 9 may be provided as one of a plurality of brackets, each corresponding to a discrete aperture. In some embodiments, the support bracket 46 illustrated in FIGS. 5 through 9 may be used as one of the brackets of a rear bracket pair 46A, 46B or of a front bracket pair 46C, 46D (see FIG. 3). For example, the support bracket illustrated in FIGS. 5 through 9 may be the left half 46A of a rear bracket pair 46A, 46B (see FIG. 3). The second or right bracket 46B of the rear bracket pair 46A, 46B may be substantially similar (e.g., a mirror image of) or identical to the left bracket 46A. In further embodiments, each support bracket 46A, 46B, 46C, 46C (see FIG. 3) may be substantially identical to the support bracket 46 illustrated in FIGS. 5 through 9.

Figure 5:
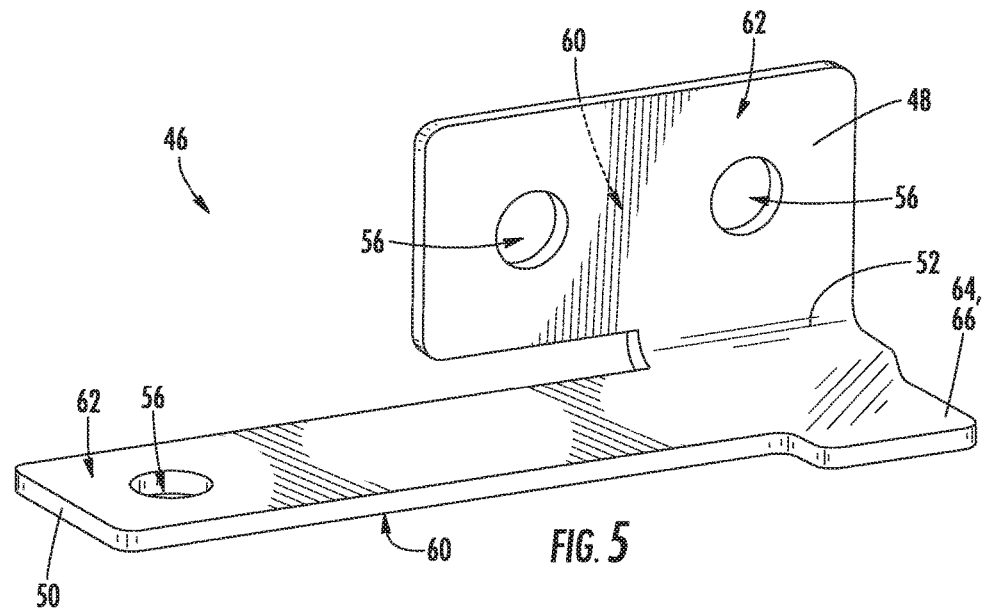
FIG. 5 is a perspective view of a bracket according to an exemplary embodiment of the present disclosure.
Figure 6:
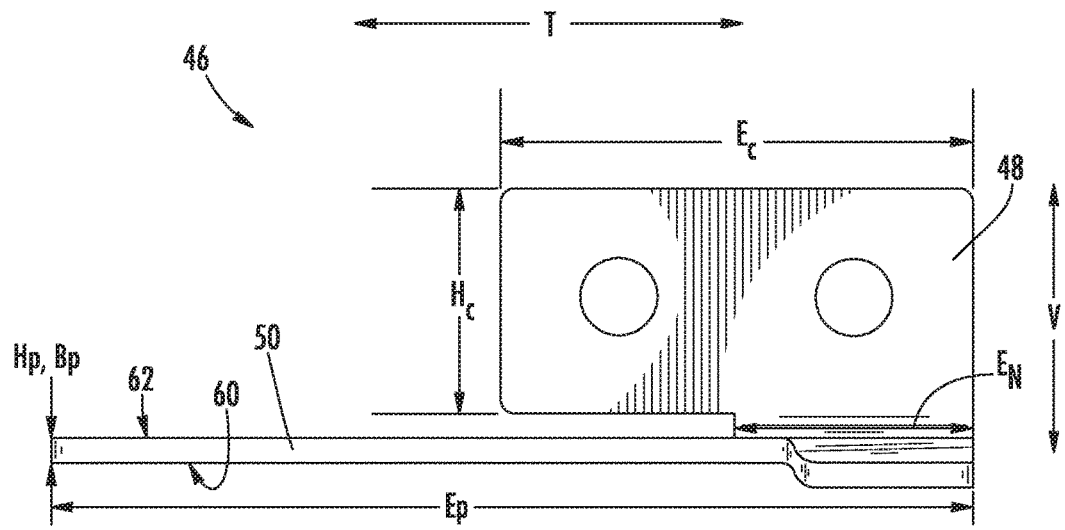
FIG. 6 is a side view of the exemplary bracket embodiment of FIG. 5.
Figure 7:
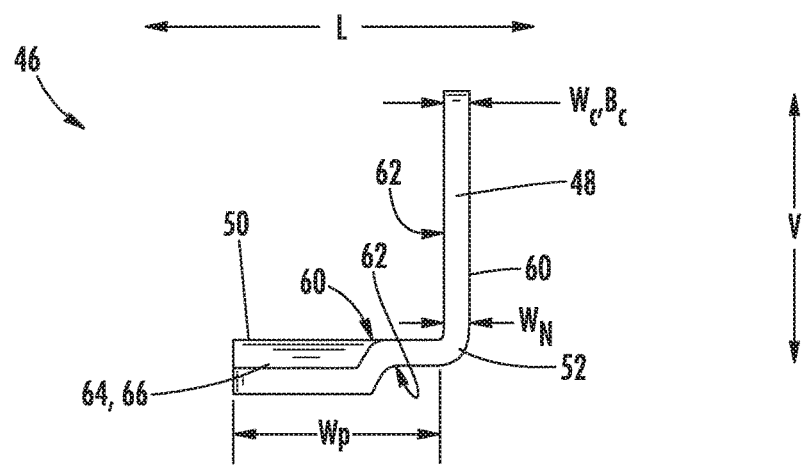
FIG. 7 is a rear view of the exemplary bracket embodiment of FIG. 5.

As shown in FIGS. 5 through 7, the cabinet tab 48 and appliance tab 50 both include several fixed dimensions (e.g., maximum dimensions), including a width $W_C$, $W_P$ extending in the lateral direction L, a length $E_C$, $E_P$ extending in the transverse direction T, and a height $H_C$, $H_P$ extending in the vertical direction V. In the exemplary embodiment of FIGS. 5 through 7, the width $W_C$ of the cabinet tab 48 is substantially smaller than the width $W_P$ of the appliance tab 50. The length $E_C$ of the cabinet tab 48 is smaller than the length $E_P$ of the appliance tab 50. Moreover, the cabinet tab 48 is positioned laterally from the appliance tab 50. Thus, the exemplary cabinet tab 48 extends to the side of the appliance tab 50, away from the width $W_P$ of the appliance tab. In some such embodiments, the width $W_C$ of the cabinet tab 48 does not overlap with a plane extending from the width $W_P$ of the appliance tab 50.

In the illustrated embodiment of FIGS. 5 through 9, the cabinet tab 48 and the appliance tab 50 each include at least two support faces 60, 62. One support face 60 may be configured to directly or indirectly engage a cabinet trim frame 54 while the second support face 62 is configured to engage an attachment member 58 (see FIG. 4). Similarly, one support face 60 of the appliance tab 50 may be configured to engage another attachment member while a second support face 62 is configured to directly or indirectly engage the bottom surface 34 of the mounting plate 28 (see FIG. 9). A constant thickness $B_C$, $B_P$ is defined between the first support face 60 and second support face 62 for each tab 48, 50 of the exemplary embodiment of FIGS. 5 through 9. In some embodiments, the first support face 60 of each tab 48, 50 is configured parallel to its corresponding second support face 62. In further embodiments, the thickness $B_C$ of the cabinet tab 48 is equal to the thickness $B_P$ of the appliance tab 50.

In the exemplary embodiment of FIGS. 5 through 9, the support bracket 46 includes an alignment lever 64 extending rearward from and/or substantially parallel to the appliance tab 50. When the support bracket 46 is mounted to the appliance hood 10, the alignment lever 64 extends toward the back 26 of the mounting plate 28 (see FIGS. 8 and 9). Moreover, the illustrated alignment lever 64 includes a corrugated tip 66 is configured to direct positioning of the appliance hood 10 in the transverse direction T. As shown, the corrugated tip 66 extends below the appliance tab 50 as well as rearward therefrom. However, additional or alternative embodiments of the corrugated tip 66 may extend above the appliance tab 50.

Figure 8:
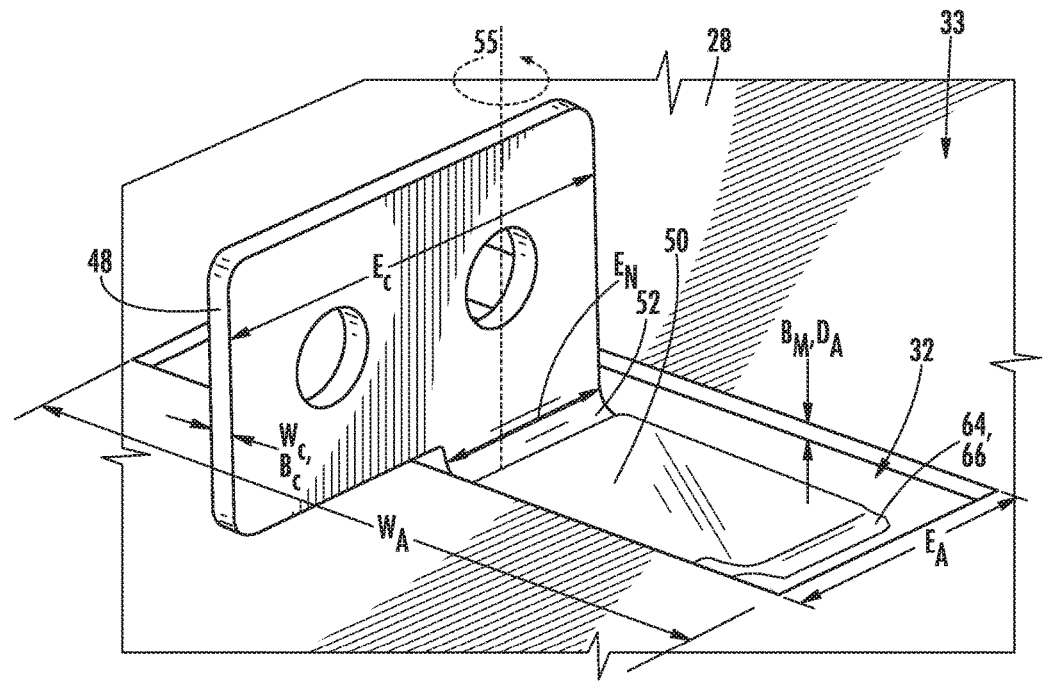
FIG. 8 is a top perspective view of an exemplary bracket embodiment positioned on an exemplary appliance according to an exemplary embodiment of the present disclosure.
Figure 9:
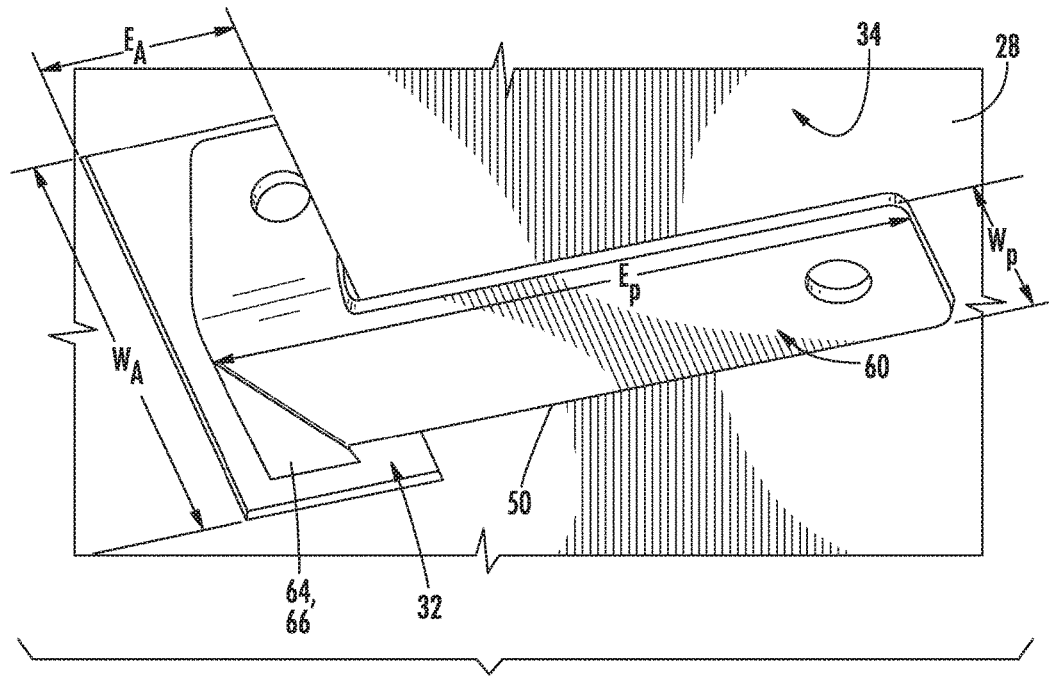
FIG. 9 is a bottom perspective view of the exemplary bracket embodiment of FIG. 8.
Figure 10:
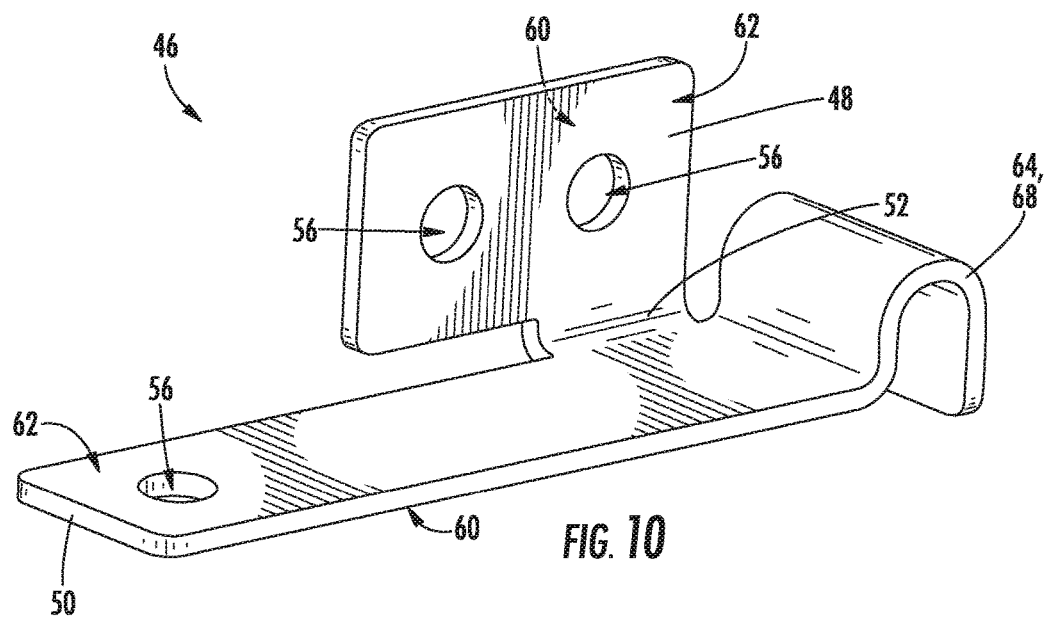
FIG. 10 is a perspective view of a bracket according to an exemplary embodiment of the present disclosure.
Figure 11:
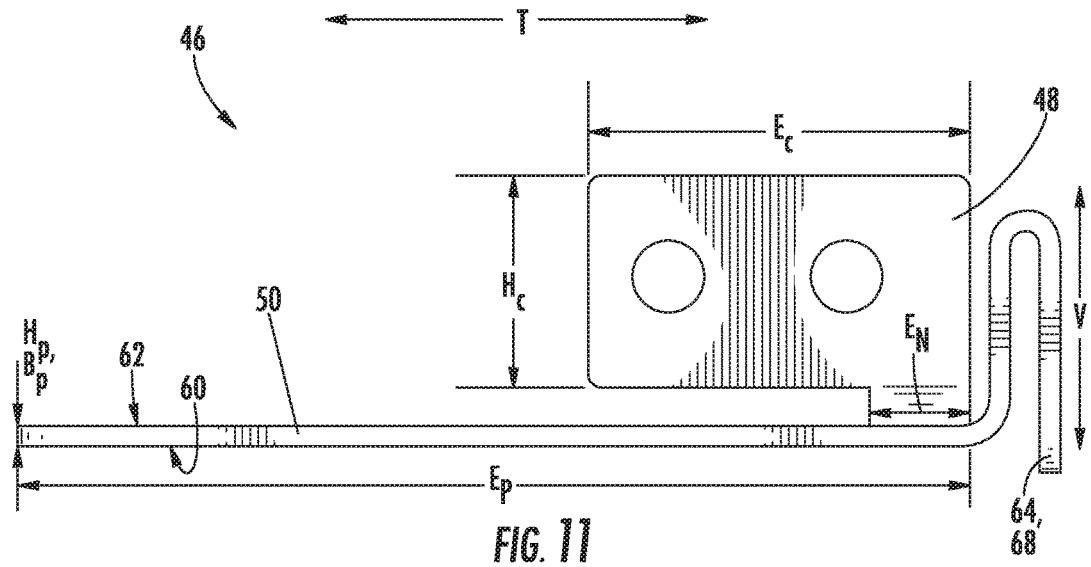
FIG. 11 is a side view of the exemplary bracket embodiment of FIG. 10.
Figure 12:
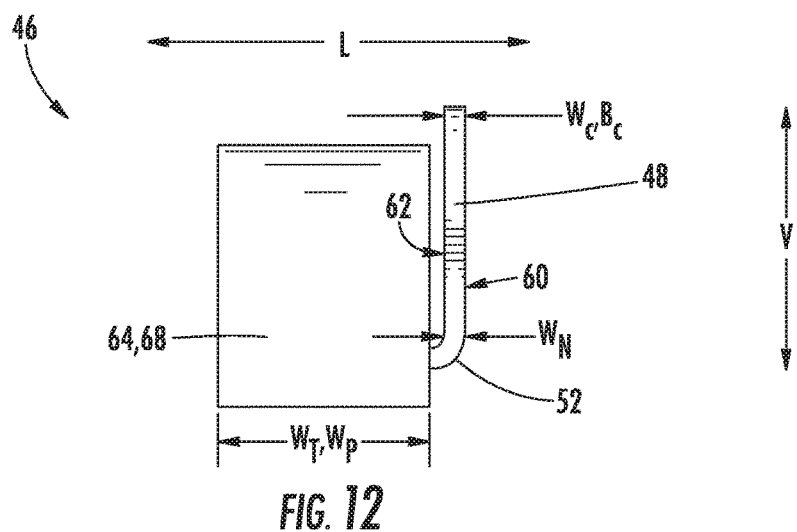
FIG. 12 is a rear view of the exemplary bracket embodiment of FIG. 10.

As shown in FIGS. 8 and 9, one or more portions of the support bracket 46 are positioned and/or sized in relation to a corresponding aperture 32. For instance, the illustrated support bracket 46 may be slidably positioned within a corresponding aperture 32. Specifically, the cabinet tab 48 can be mountably disposed above the mounting plate 28 in the vertical direction V while the appliance tab 50 is mountably disposed below the mounting plate 28. The integral neck 52 is rotatably disposed within the aperture. When mounted, the support bracket 46 can slide within the aperture 32 along the width $W_A$ to vary the bracket's mounted position. During installation, the appliance hood 10 will be mountable beneath and between cabinets 22 (see FIG. 1) of various sizes and spacings.

As shown in FIGS. 8 and 9, the corrugated tip 66 extends below the mounting plate 28 to maintain the appliance tab 50 below the mounting plate 28. When the bracket 46 is mounted within the aperture 32, inadvertent attempts to move the appliance hood 10 forward and out of engagement with the appliance tab 50, e.g., above the mounting plate 28, may thereby be restricted by the corrugated tip 66.

In the exemplary embodiment of FIGS. 8 and 9, the length $E_C$ and width $W_C$ of the cabinet tab 48 is less than the width $W_A$ of a corresponding aperture 32. The width $W_P$ of the appliance tab 50 is less than the width $W_A$ of the corresponding aperture 32. The length $E_P$ of the appliance tab 50 is greater than the length $E_A$ of the aperture 32. Moreover, the integral neck 52 has a length $E_N$ and a width $W_N$ (see FIG. 7) both smaller than the length $E_A$ of the aperture 32 and the width $W_A$ of the aperture 32.

In some embodiments, the support bracket 46 is configured for selective insertion or removal from a corresponding aperture 32. As shown in FIGS. 8 and 9, the corresponding dimensions of the support bracket 46 and aperture 32 for certain embodiments may prevent vertical passage of the support bracket 46 through the aperture 32 in a mounted position while allowing horizontal movement along the length $E_A$ of the aperture 32 (see also FIGS. 13, 14, 17, 18, 23, and 24). Nonetheless, some embodiments of the support bracket 46 can be rotated about a vertical axis 55 for selective insertion or removal from the aperture 32.

Turning to the FIGS. 10 through 14, an additional bracket embodiment is illustrated. Optionally, the exemplary support bracket 46 of FIGS. 10 through 14 may be provided as one of a plurality of brackets, each corresponding to a discrete aperture. In some embodiments, the support bracket 46 illustrated in FIGS. 10 through 14 may be used as half of a rear bracket pair 46A, 46B or front bracket pair 46C, 46D (see FIG. 3). For example, the support bracket illustrated in FIGS. 10 through 14 may be the left half 46A of a rear bracket pair 46A, 46B (see FIG. 3). The second or right bracket 46B of the rear bracket pair 46A, 46B may be substantially similar (e.g., a mirror image of) or identical to the left bracket 46A. In further embodiments, each support bracket 46A, 46B, 46C, 46C (see FIG. 3) may be substantially identical to the support bracket 46 illustrated in FIGS. 10 through 14.

As shown, the exemplary embodiment of a support bracket 46 in FIGS. 10 through 14 includes certain features that are similar to the embodiment of FIGS. 5 through 9. For instance, the exemplary support bracket 46 of FIGS. 10 through 14 includes a cabinet tab 48 joined to an appliance tab 50 by an integral neck 52. The width $W_C$ of the cabinet tab 48 is substantially smaller than the width $W_A$ of the appliance tab 50. Moreover, the length $E_C$ of the cabinet tab 48 is smaller than the length $E_P$ of the appliance tab 50. An equal constant thickness $B_C$, $B_P$ is defined across both. In addition, other dimensions and/or features may be considered substantially identical to the embodiment of FIGS. 5 through 9, unless otherwise indicated.

The exemplary embodiment of a support bracket 46 in FIGS. 10 through 14 includes an alignment lever 64 having an arcuate hook 68 extending from the appliance tab 50. As shown, the arcuate hook 68 includes a width $W_L$ that is less than or equal to the width $W_P$ of the appliance tab 50. Moreover, the arcuate hook 68 extends vertically from the appliance tab 50 before descending in the opposite direction.

The arcuate hook 68 may be configured to engage or fit within at least a portion of the appliance hood 10. In the exemplary embodiment of FIGS. 13 and 14, a secondary channel 72 is defined within the mounting plate 28 rearward of the aperture 32 to receive the arcuate hook 68. When mounted or installed, the arcuate hook 68 may extend into the secondary channel 72. Inadvertent attempts to move the appliance hood 10 forward and out of engagement with the appliance tab 50, e.g., above the mounting plate 28, may thereby be restricted by the arcuate hook 68.

Figure 13:
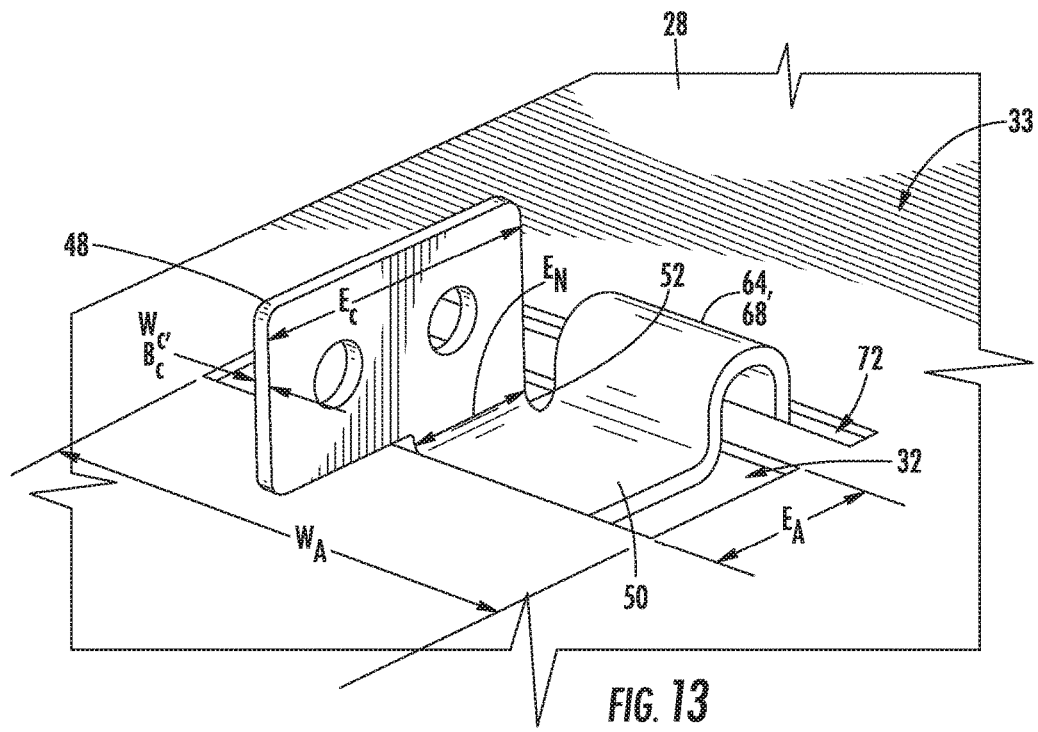
FIG. 13 is a top perspective view of an exemplary bracket embodiment positioned on an exemplary appliance hood according to an exemplary embodiment of the present disclosure.
Figure 14:
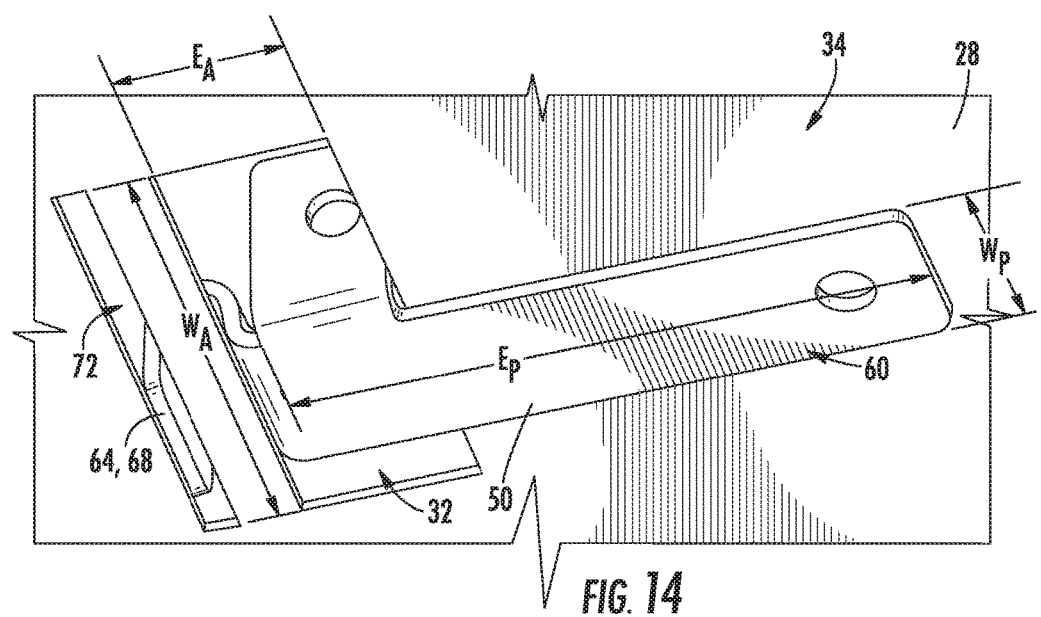
FIG. 14 is a bottom perspective view of the exemplary bracket embodiment of FIG. 13.
Figure 15:
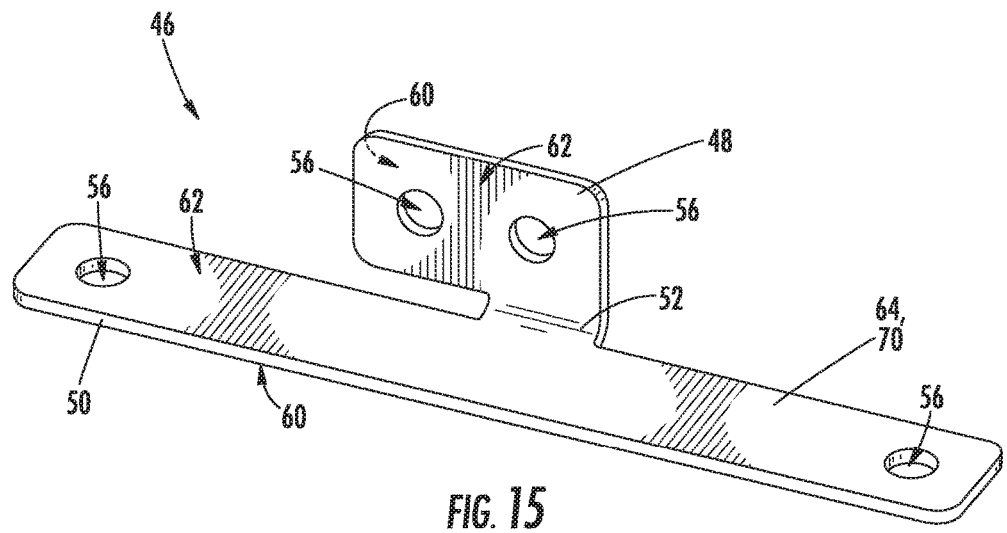
FIG. 15 is a perspective view of a bracket according to an exemplary embodiment of the present disclosure.
Figure 16:
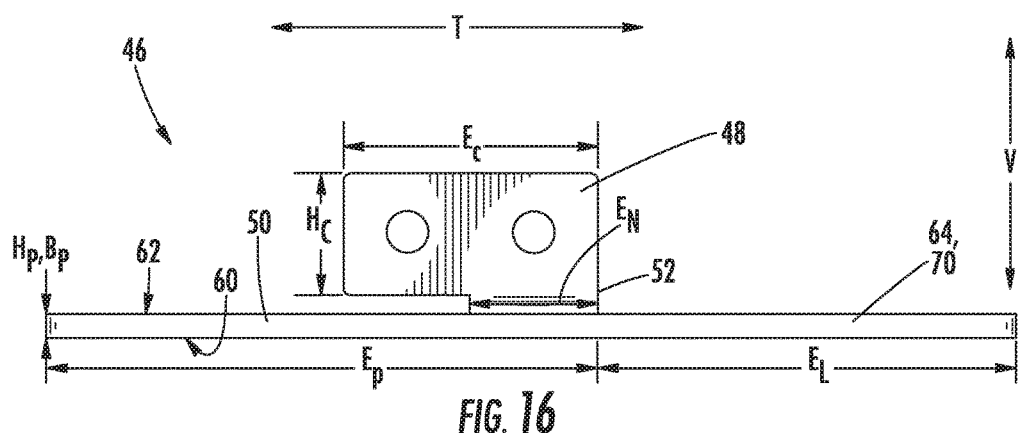
FIG. 16 is a side view of the exemplary bracket embodiment of FIG. 15.

As shown in FIGS. 13 and 14, the exemplary embodiment of a support bracket 46 in FIGS. 10 through 14 includes a cabinet tab 48 having a length $E_C$ and width $W_C$ that is less than the width $W_A$ of the corresponding aperture 32. The width $W_P$ of the appliance tab 50 is less than the width $W_A$ of the corresponding aperture 32. The length $E_P$ of the appliance tab 50 is greater than the length $E_A$ of the aperture 32. Moreover, the integral neck 52 has a length $E_N$ and a width $W_N$ (see FIG. 12) both smaller than the length $E_A$ of the aperture 32 and the width $W_A$ of the aperture 32.

Turning to the FIGS. 15 through 18, an additional bracket embodiment is illustrated. Optionally, the exemplary support bracket 46 of FIGS. 15 through 18 may be provided as one of a plurality of brackets, each corresponding to a discrete aperture. In some embodiments, the support bracket 46 illustrated in FIGS. 15 through 18 may be used as half of a rear bracket pair 46A, 46B or front bracket pair 46C, 46D (see FIG. 3). For example, the support bracket illustrated in FIGS. 15 through 18 may be the left half 46A of a rear bracket pair 46A, 46B (see FIG. 3). The second or right bracket 46B of the rear bracket pair 46A, 46B may be substantially similar (e.g., a mirror image of) or identical to the left bracket 46A. In further embodiments, each support bracket 46A, 46B, 46C, 46C (see FIG. 3) may be substantially identical to the support bracket 46 illustrated in FIGS. 15 through 18.

As shown, the exemplary support bracket 46 of FIGS. 15 through 18 includes certain features that are similar the embodiment illustrated in FIGS. 5 through 9. For instance, the exemplary support bracket 46 of FIGS. 15 through 18 includes a cabinet tab 48 joined to an appliance tab 50 by an integral neck 52. The width $W_C$ of the cabinet tab 48 is substantially smaller than the width $W_P$ of the appliance tab 50. Moreover, the length $E_C$ of the cabinet tab 48 is smaller than the length $E_P$ of the appliance tab 50. An equal constant thickness $B_C$, $B_P$ (see FIGS. 16 and 17) is defined across both. In addition, other dimensions and/or features may be considered substantially identical to the embodiment of FIGS. 5 through 9, unless otherwise indicated.

The exemplary embodiment of a support bracket 46 in FIGS. 15 through 18 includes an alignment lever 64 having a continuous planar surface 70 extending from the appliance tab 50 in the transverse direction T. The continuous planar surface 70 includes a width $W_L$ that is less than or equal to the width $W_P$ of the appliance tab 50. As illustrated, some embodiments of the continuous planar surface 70 extends integrally from the appliance tab 50 and flush therewith. Optionally, the continuous planar surface 70 may be substantially identical to the length $E_P$ portion of the appliance tab 50 past the integral neck 52. When mounted or installed, the continuous planar surface 70 may extend to and abut the backsplash wall 30 or rear cabinet portion. In some such embodiments, the continuous planar surface 70 may define a desired mounted position for the appliance hood 10, determined by a relative distance to the wall 30 or rear cabinet portion.

Figure 17:
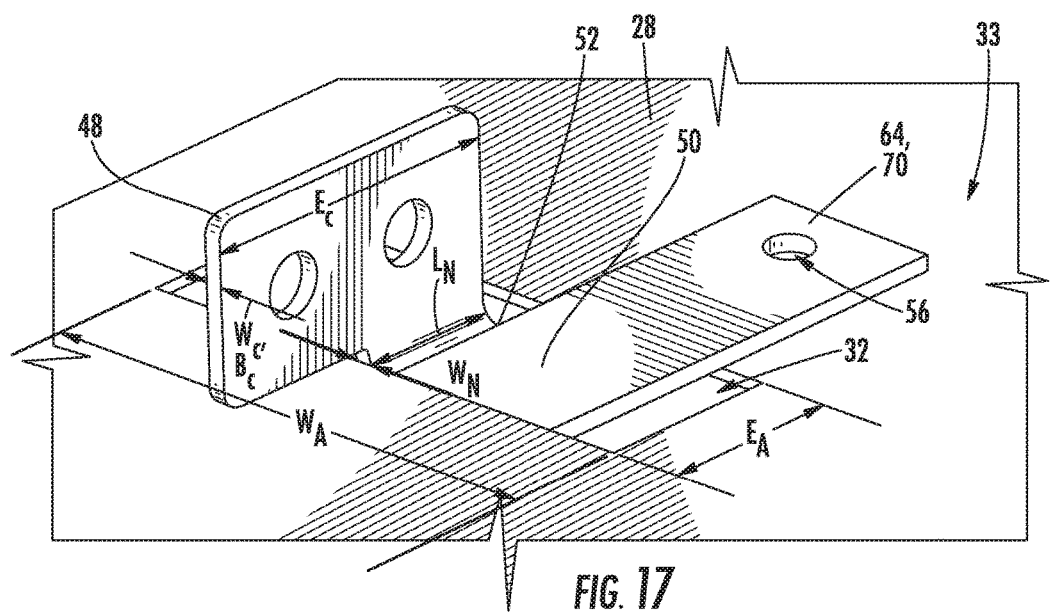
FIG. 17 is a top perspective view of an exemplary bracket embodiment positioned on an exemplary appliance hood according to an exemplary embodiment of the present disclosure.
Figure 18:
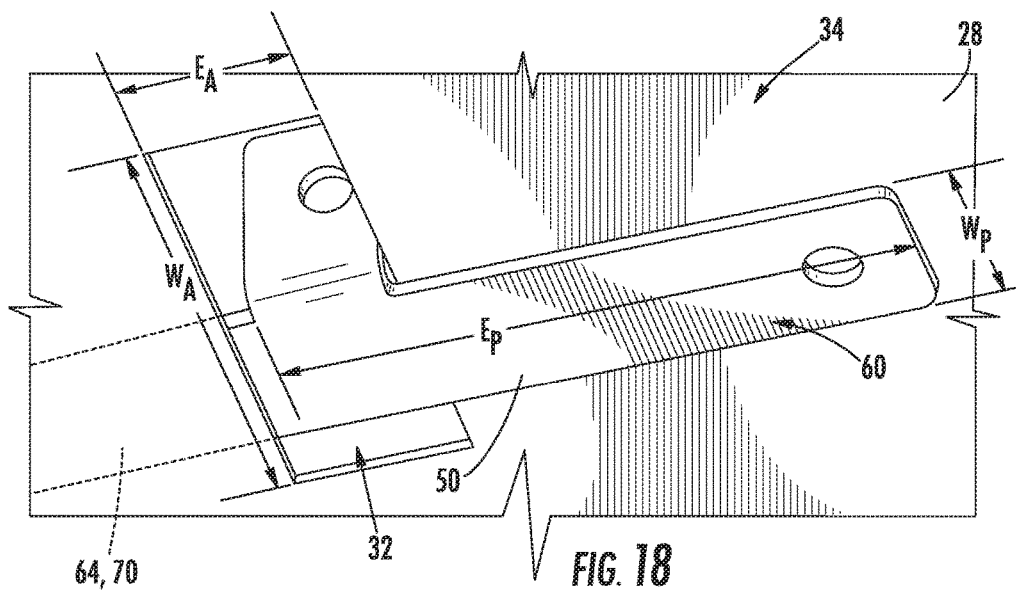
FIG. 18 is a bottom perspective view of the exemplary bracket embodiment of FIG. 17.

As shown in FIGS. 17 and 18, the exemplary embodiment in FIGS. 15 through 18 includes a cabinet tab 48 having a length $E_C$ and width $W_C$ of the cabinet tab 48 that is less than the width $W_A$ of the corresponding aperture 32. The width $W_P$ of the appliance tab 50 is less than the width $W_A$ of the corresponding aperture 32. The length $E_P$ of the appliance tab 50 is greater than the length $E_A$ of the aperture 32. Moreover, the integral neck 52 has a width and a length $E_N$ both smaller than the length $E_A$ of the aperture 32 and the width $W_A$ of the aperture 32.

Turning to the FIGS. 19 through 24, further exemplary bracket embodiments are illustrated. Optionally, one of the exemplary support brackets 46 of FIGS. 19 through 24 may be provided as one of a plurality of brackets, each corresponding to a discrete aperture. In some embodiments, one of the support brackets 46 illustrated in FIGS. 19 through 24 may be used as half of a rear bracket pair 46A, 46B or front bracket pair 46C, 46D (see FIG. 3). For example, one of the support brackets 46 illustrated in FIGS. 19 through 24 may be the left half 46C of a front bracket pair 46C, 46D (see FIG. 3). The second or right bracket 46D of the front bracket pair 46C, 46D may be substantially similar (e.g., a mirror image of) or identical to the left bracket 46C. In further embodiments, each support bracket 46A, 46B, 46C (see FIG. 3) may be substantially identical to one of the support brackets 46 illustrated in FIGS. 19 through 24.

Figure 19:
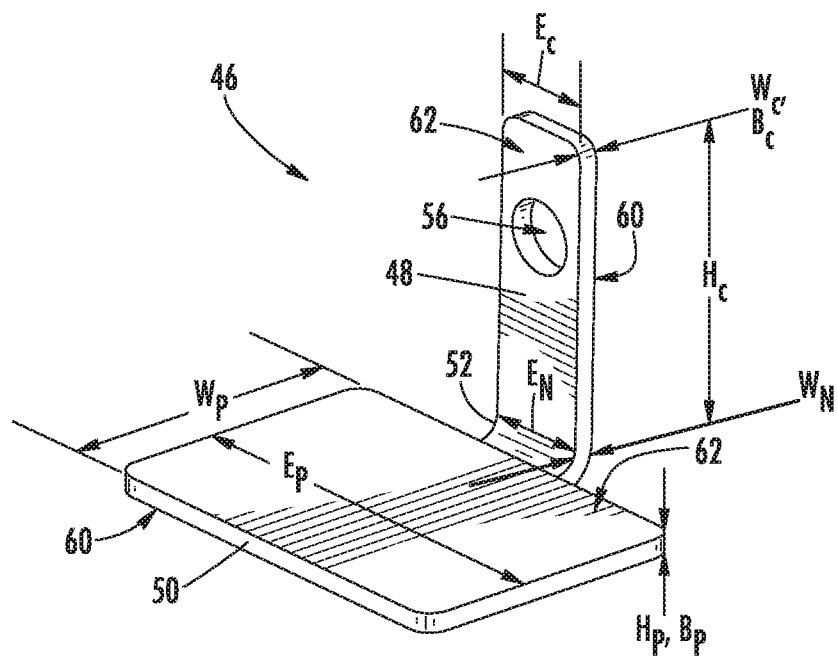
FIG. 19 is a perspective view of a bracket according to an exemplary embodiment of the present disclosure.
Figure 20:
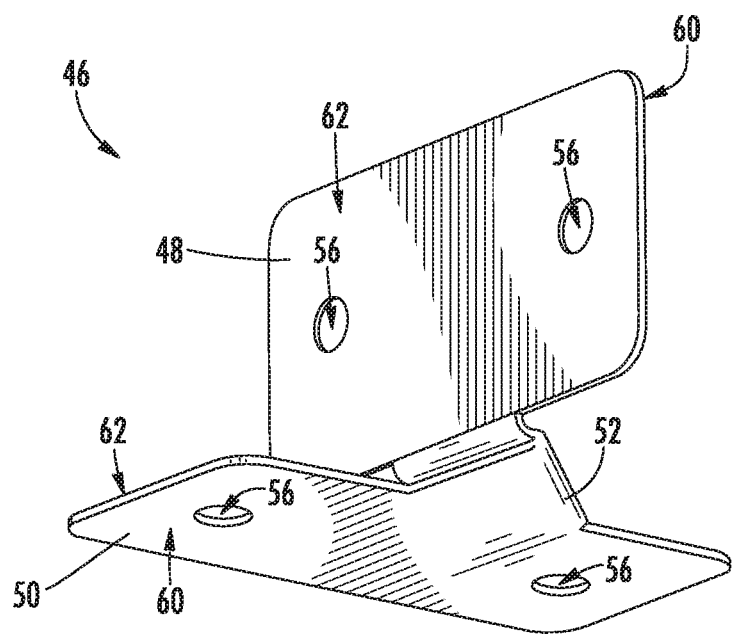
FIG. 20 is a perspective view of a bracket according to an exemplary embodiment of the present disclosure.
Figure 21:
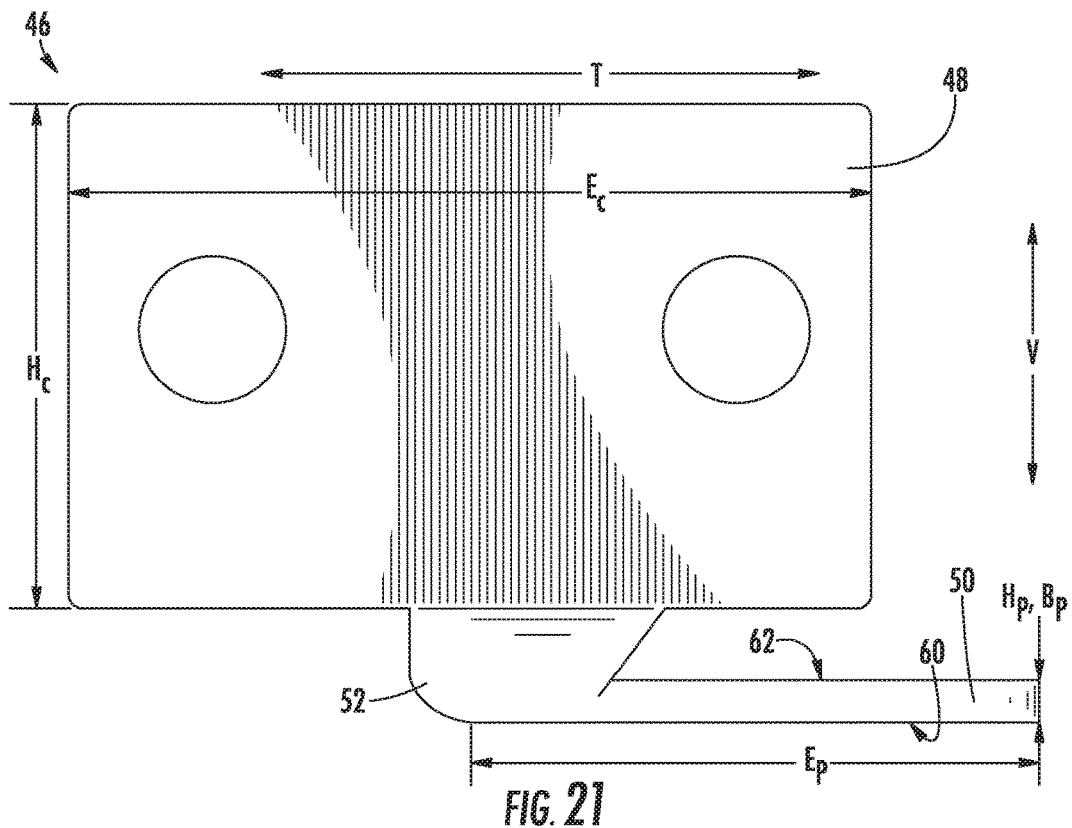
FIG. 21 is a side view of the exemplary bracket embodiment of FIG. 21.
Figure 22:
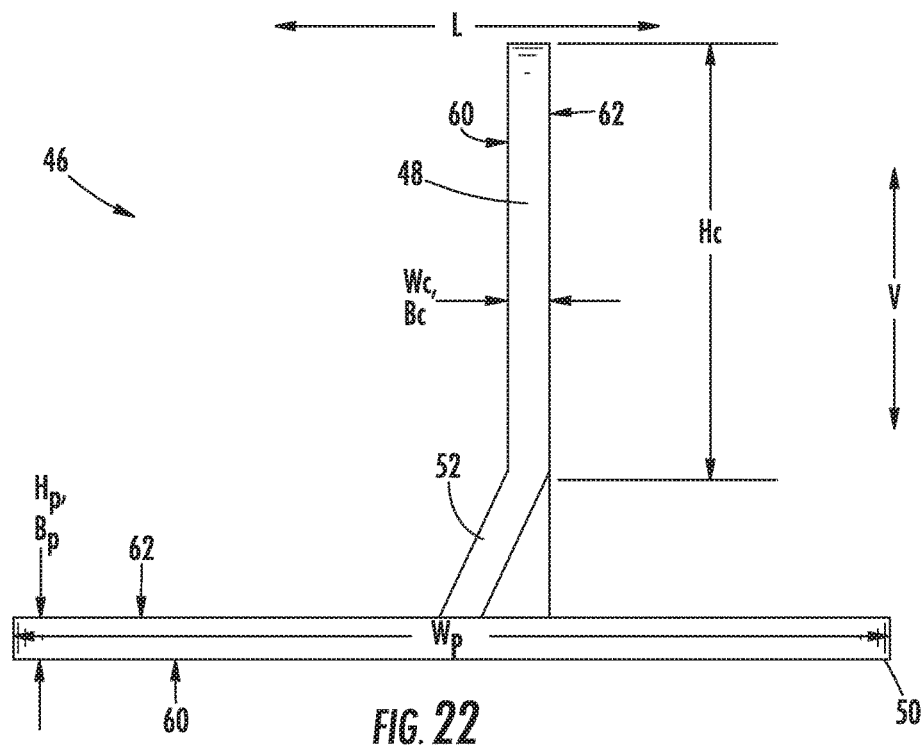
FIG. 22 is a rear view of the exemplary bracket embodiment of FIG. 22.

As illustrated, the exemplary embodiment of a support bracket 46 in FIG. 19 includes a cabinet tab 48 and an appliance tab 50, joined together by an integral neck 52. The width $W_C$ of the cabinet tab 48 is substantially smaller than the width $W_P$ of the appliance tab 50. Moreover, the length $E_C$ of the cabinet tab 48 is smaller than the length $E_P$ of the appliance tab 50. An equal constant thickness $B_C$, $B_P$ is defined across both. The length $E_N$ and width $W_N$ of the integral neck 52 is equal to the respective length $E_C$ and width $W_C$ of the cabinet tab 48. Furthermore, in the illustrated embodiment an attachment hole 56 is defined through the cabinet tab 48. By contrast, the appliance tab 50 of FIG. 19 is a substantially planar member free of any orifices.

Turning to FIGS. 20 through 24, another exemplary embodiment of a support bracket 46 includes a cabinet tab 48 joined by a folded integral neck 52 to an appliance tab 50. The cabinet tab 48 extends vertically from a central position relative to the width $W_P$ of the appliance tab 50. As shown, the width $W_C$ of the cabinet tab 48 is substantially smaller than the width $W_P$ of the appliance tab 50. Moreover, the length $E_C$ of the cabinet tab 48 is smaller than the length $E_P$ of the appliance tab 50. An equal constant thickness $B_C$, $B_P$ is defined across both. The integral neck 52 extends rearward from the appliance tab 50 and defines a corner fold redirecting the integral neck 52 forward towards the cabinet tab 48

In the exemplary embodiment of FIGS. 20-24, two attachment holes 56 are defined on opposite widthwise sides of the appliance tab 50 and are configured to receive an attachment member 58. Optional embodiments may include more or less attachment holes 56 in various suitable positions, as described above.

Figure 23:
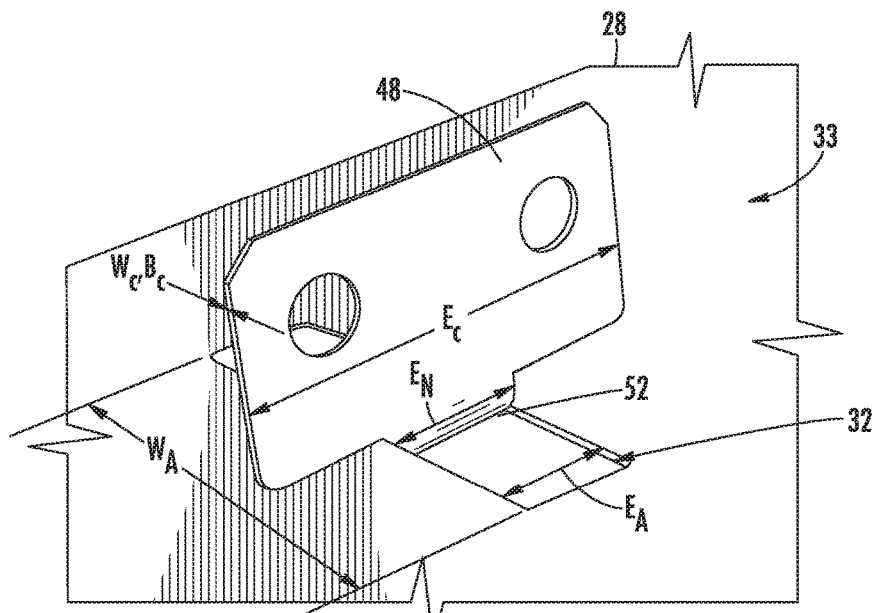
FIG. 23 is a top perspective view of an exemplary bracket embodiment positioned on an exemplary appliance according to an exemplary embodiment of the present disclosure.
Figure 24:
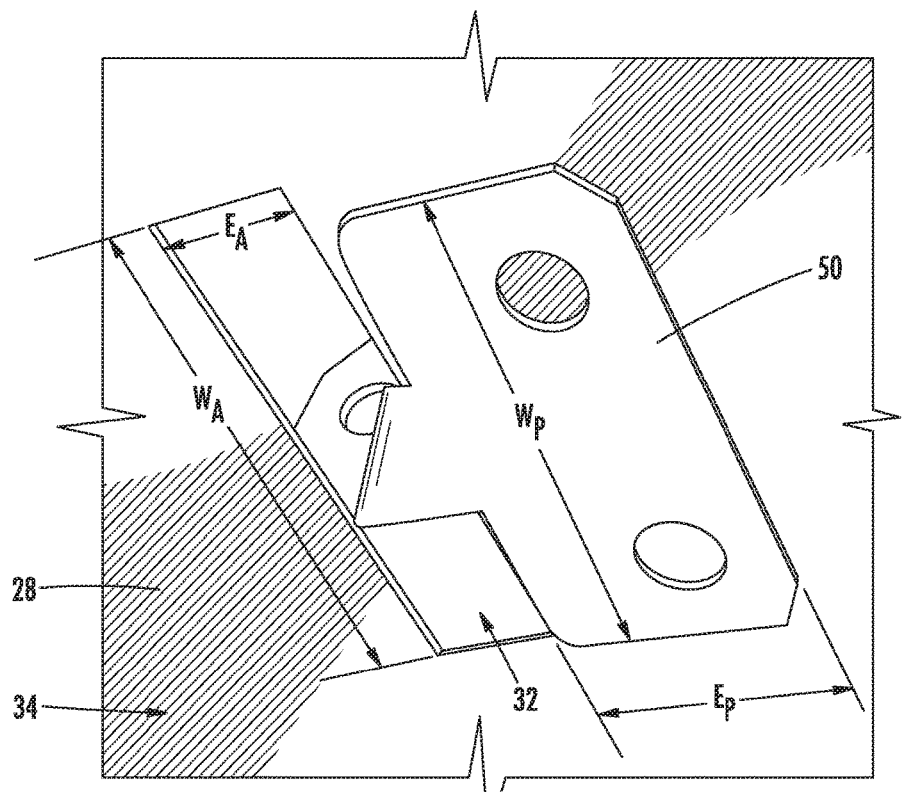
FIG. 24 is a bottom perspective view of the exemplary bracket embodiment of FIG. 23.

As shown in FIGS. 23 and 24, the exemplary embodiment of a support bracket 46 in FIGS. 20 through 24 includes a width $W_C$ of the cabinet tab 48 that is less than the width $W_A$ of the corresponding aperture 32. By contrast, the length $E_C$ of the cabinet tab 48 is greater than the length $E_A$ of the aperture 32. The width $W_P$ of the appliance tab 50 is less than the width $W_A$ of the corresponding aperture 32, while the length $E_P$ of the appliance tab 50 is greater than the length $E_A$ of the aperture 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
    an appliance hood extending between a front and a back, the appliance hood including a mounting plate defining
        a rear aperture pair at the back, each rear aperture having a width extending in a lateral direction and a length extending in a transverse direction, and
        a forward aperture pair at the front, each forward aperture having a width extending in the lateral direction and a length extending in the transverse direction;
    a rear bracket pair, each rear bracket being slidably disposed through a corresponding rear aperture, each rear bracket comprising
        a rear cabinet tab disposed above the mounting plate in a vertical direction, and
        a rear appliance tab disposed below the mounting plate and orthogonal to the rear cabinet tab, the rear appliance tab having a width extending in the lateral direction, the width of the rear appliance tab being greater than the width of the rear cabinet tab; and
    a forward bracket pair, each forward bracket being slidably disposed through a corresponding forward aperture, each forward bracket comprising
        a forward cabinet tab disposed above the mounting plate in the vertical direction, the forward cabinet tab having a length extending in the transverse direction, the length of the forward cabinet tab being less than the width of the corresponding forward aperture, and
        a forward appliance tab disposed below the mounting plate and orthogonal to the forward cabinet tab,
        wherein each forward appliance tab includes a length extending in the transverse direction, the length of the forward appliance tab being greater than the length of the corresponding forward aperture.

2. The appliance of claim 1, wherein each rear bracket includes an integral neck joint rotatably disposed within the corresponding rear aperture between the rear cabinet tab and the rear appliance tab.

3. The appliance of claim 1, wherein each forward bracket further includes an integral neck joint rotatably disposed within the corresponding forward aperture between the forward cabinet tab and the forward appliance tab.

4. The appliance of claim 1, wherein the mounting plate includes a top surface and an oppositely-disposed bottom surface, and wherein each rear appliance tab is selectively fixed against the bottom surface of the mounting plate.

5. The appliance of claim 1, wherein the length of each forward appliance tab spans the length of the corresponding forward aperture.

6. The appliance of claim 1, wherein the length of each forward cabinet tab is greater than the length of the corresponding forward aperture.

7. The appliance of claim 1, wherein the length of each forward cabinet tab is less than the length of the corresponding forward aperture.

8. The appliance of claim 1, wherein each cabinet tab defines at least one orifice configured to receive a nail, bolt, or screw.

9. The appliance of claim 1, wherein each rear bracket includes an alignment lever extending from the rear appliance tab toward the back of the mounting plate.

10. The appliance of claim 9, wherein the alignment lever includes a corrugated tip, an arcuate hook, or a continuous planar surface.

11. An appliance comprising:
an appliance hood extending between a front and a back, the appliance hood including a mounting plate defining a plurality of apertures, each aperture having a width extending in a lateral direction and a length extending in a transverse direction; and
a plurality of support brackets, each support bracket being slidably disposed through a corresponding aperture of the plurality of apertures, each support bracket comprising
a cabinet tab disposed above the mounting plate in a vertical direction, the cabinet tab having a length extending in the transverse direction, the length of the cabinet tab being less than the width of the corresponding aperture, and
an appliance tab disposed below the mounting plate and orthogonal to the cabinet tab, the appliance tab having a length extending in the transverse direction, the length of the appliance tab being greater than the length of the corresponding aperture,
wherein the plurality of apertures includes a forward aperture and a rear aperture, the forward aperture being positioned proximal to the front of the appliance hood along the transverse direction, the rear aperture being positioned proximal to the back of the appliance hood along the transverse direction.

12. The appliance of claim 11, wherein each support bracket includes an integral neck joint extending between the cabinet tab and the appliance tab, the integral neck joint being rotatably disposed within the corresponding aperture.

13. The appliance of claim 11, wherein the length the cabinet tab is greater than the length of the corresponding aperture.

14. The appliance of claim 11, wherein the length of the cabinet tab is less than the length of the corresponding aperture.

15. The appliance of claim 11, wherein the plurality of apertures includes a rear aperture pair defined at the back of the appliance hood and a forward aperture pair defined at the front of the appliance hood, and wherein plurality of support brackets include a rear bracket pair and a forward bracket pair corresponding to the respective rear aperture pair and forward aperture pair.

16. The appliance of claim 15, wherein each rear bracket includes a rear appliance tab length and a rear cabinet tab length, and wherein the rear appliance tab length is greater than the rear cabinet tab length.

17. The appliance of claim 11, wherein at least one support bracket includes an alignment lever extending away from the appliance tab in the transverse direction.

18. The appliance of claim 17, wherein the alignment lever includes a corrugated tip, an arcuate hook, or a continuous planar surface.

19. An appliance comprising:
an appliance hood extending between a front and a back, the appliance hood including a mounting plate defining a plurality of apertures, each aperture having a width extending in a lateral direction and a length extending in a transverse direction; and
a plurality of support brackets, each support bracket being selectively positionable through a corresponding aperture of the plurality of apertures along the width of the corresponding aperture, each support bracket comprising
a cabinet tab mountable above the mounting plate in a vertical direction, the cabinet tab having a length extending in the transverse direction, the length of the cabinet tab being less than the width of the corresponding aperture, and
an appliance tab orthogonal to the cabinet tab and mountable below the mounting plate, the appliance tab having a length extending in the transverse direction, the length of the appliance tab being greater than the length of the corresponding aperture,
wherein the plurality of apertures includes a forward aperture and a rear aperture, the forward aperture being positioned proximal to the front of the appliance hood along the transverse direction, the rear aperture being positioned proximal to the back of the appliance hood along the transverse direction.

* * * * *